Aug. 16, 1949.  A. GOLDBERG  2,479,343
OPTICAL IMAGE PROJECTOR FOR
VARIABLE INDICATING DEVICES
Filed June 21, 1945  2 Sheets-Sheet 1

Inventor:
Arnold Goldberg,
by Merton D Moore
His Attorney.

Aug. 16, 1949.  A. GOLDBERG  2,479,343
OPTICAL IMAGE PROJECTOR FOR
VARIABLE INDICATING DEVICES
Filed June 21, 1945 2 Sheets-Sheet 2
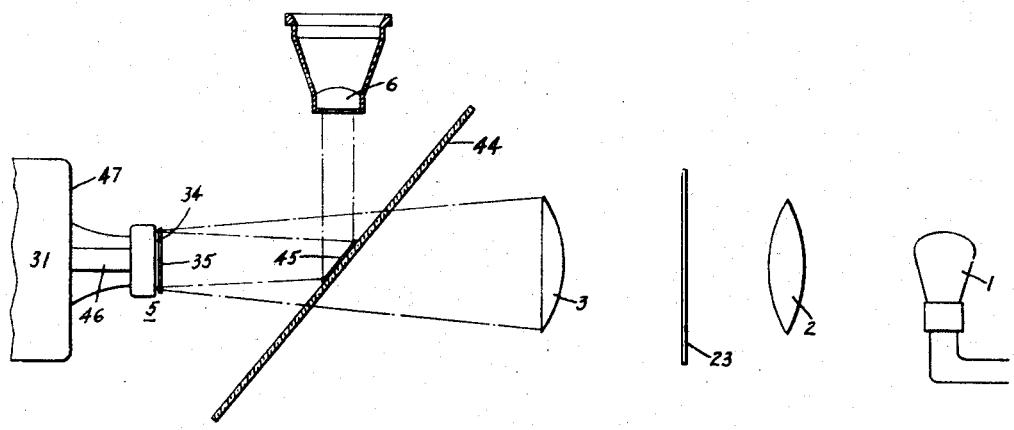
Inventor:
Arnold Goldberg,
by  Merton D. Morse
His Attorney.

Patented Aug. 16, 1949

2,479,343

UNITED STATES PATENT OFFICE 2,479,343

OPTICAL IMAGE PROJECTOR FOR VARIABLE INDICATING DEVICES

Arnold Goldberg, Bridgeport, Conn., assignor to General Electric Company, a corporation of New York Application June 21, 1945, Serial No. 600,769

2 Claims. (Cl. 88—24)

My invention relates to optical projectors and it has for its primary object to provide a new and improved means for projecting a variable indication of measurement without requiring any physical connection between the projecting means and the indicating means.

It is usual in the control systems for ships to employ a gyro system to which is connected a compass dial for indication of the position of the ship. Moreover, it is desirable in navigation to have an enlarged image of a compass dial in a system using a Selsyn motor connected with the ship's gyro system to function as a compass indicator or repeater. Difficulty has been encountered in projecting enlarged images of the compass dial carried by the Selsyn motor for such a compass dial must be of light weight and have very low inertia, and any projecting system employed therewith should have a minimum connection with the Selsyn system inasmuch as the slightest drag or binding in the Selsyn system can produce errors in other equipment employed in the navigation of the ship. It is an object of my present invention to provide a new and improved compass dial projector for a ship employing a Selsyn motor to provide bearing indications and which has no physical contact with the Selsyn system.

It is another object of my invention to provide a new and improved projector of the specular type which gives a true and distortionless enlarged image of the object being viewed.

It is still another object of my invention to provide a new and improved projector in which uniform illumination of an image to be projected is obtained.

It is a further object of my invention to provide a new and improved specular projecting system in which a light source is located in front of an object to be projected and in which an enlarged image of the object is obtained with the use of a small illumination source and a simple lens system.

Figure 1:
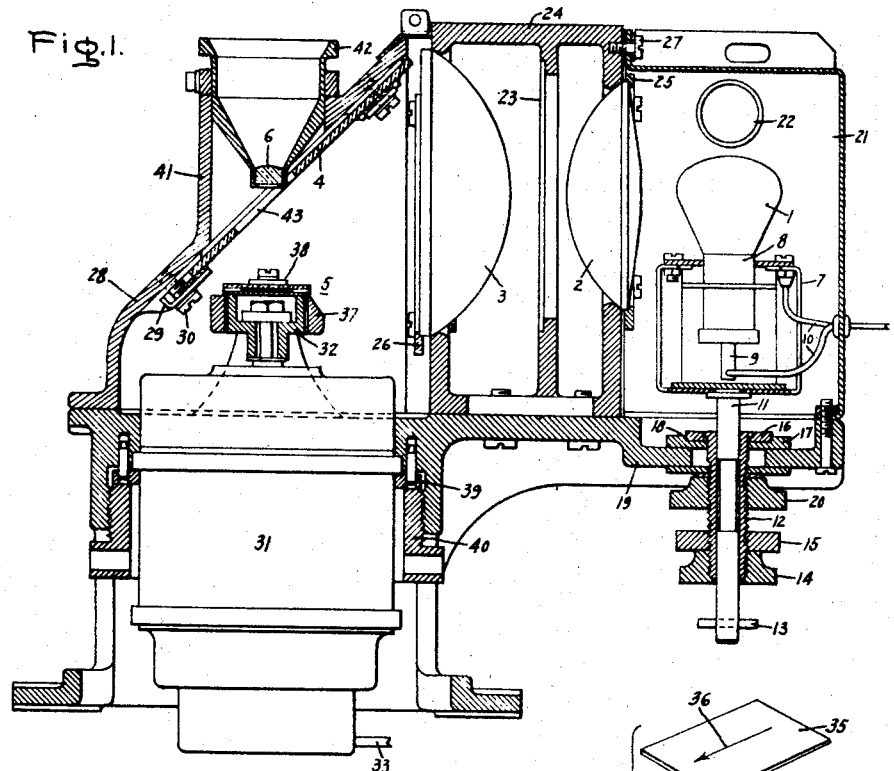
Figure 3:
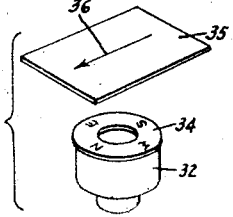
Figure 2:
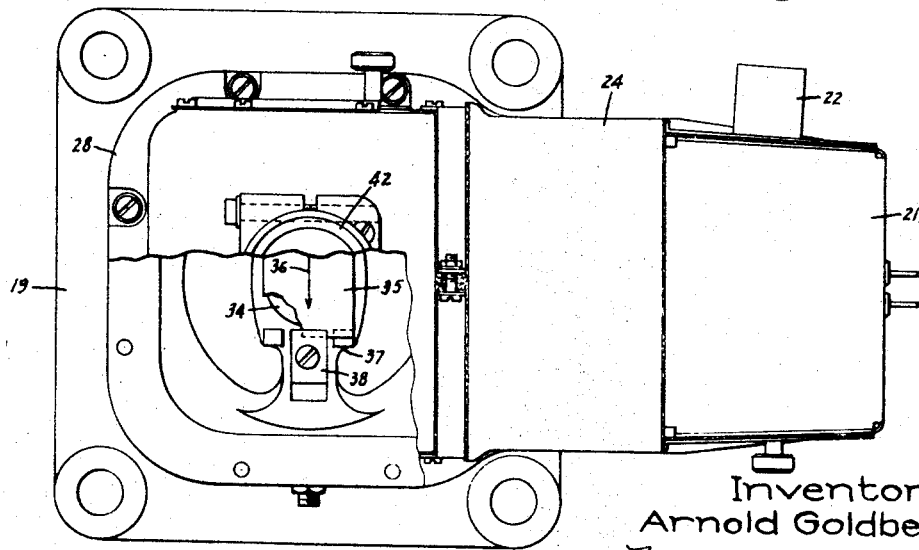

For a better understanding of my invention, reference may be had to the following description taken in connection with the accompanying drawing, and its scope will be pointed out in the appended claims. Figs. 1 and 2 are, respectively, vertical and plane views, each partially in section, of a projection system suitably embodying the invention; Fig. 3 is an exploded view of an element of the projector of Fig. 1 and Fig. 4 illustrates schematically a modification of the projection system of Fig. 1.

Referring to Figures 1 and 2 jointly, the projection system there illustrated comprises a light source which may be a lamp 1, a condensing lens system employing a pair of lenses 2, 3 and a reflecting mirror 4, an indicating instrument 5, an enlarged image of which it is desired to obtain, and a projection lens 6. The source of light 1 may take the form of a projector lamp seated in a support 7 which makes conductive contact with the base 8 of the lamp and which likewise supports an auxiliary contact 9 which makes conductive connection with the usual contact at the bottom of the lamp 1. Electrical energy for heating the filament of the lamp 1 may be supplied over the conductors 10 connected to any source of electric voltage.

The support 7 is mounted on a vertical shaft 11 which passes through the axial bore of a threaded tube 12. The vertical and angular positions of the lamp 1 may be adjusted by movement of shaft 11 in the tube 12, such movement being obtained by means of the pin 13. A knurled clamping ring 14 and a knurled locking ring 15 provide means for securing the vertical and angular positions of the lamp. Adjustment of the longitudinal and lateral positions of the lamp 1 is obtained, respectively, by means of the sliders 16, 17, the slider 17 having a guide 18 to receive the slider 16. The sliders are supported from a frame member 19 and are clamped thereto in adjusted position by means of a knurled clamping ring 20. The lamp 1 is enclosed in a lamp housing 21 which is provided with a plurality of ventilating ports 22.

The condensing lens system of the projector comprises the small condensing lens 2, the large condensing lens 3, and a filter 23. The lenses are supported in aligned apertures in a lens mounting casting 24 by means of lens hold-down plates 25, 26. The lens mounting casting 24 is likewise supported on the frame member 19 and is mechanically joined to the lamp housing 21 by means of a plurality of bolts 27.

Means are provided for changing the direction of the converging beam of light and may comprise the mirror 4 which is inclined at an angle to the optical axis of the condensing lens system and is supported in a housing member 28, in turn supported on the frame member 19. A portion of the housing 28 is inclined at an angle of approximately 45° with the upper surface of the frame member 19 and the mirror 4 is supported against this portion of the housing member by means of clamps 29 and screws 30.

The frame member 19 likewise serves as a support for a Selsyn motor 31, upon the vertical shaft of which is mounted a cup-shaped member 32 across the open end of which is attached the indicating instrument 5. As has been previously stated, the instrument 5 may be a compass dial and the Selsyn motor 31 may be connected by means of leads 33 to a gyro system of a ship. Portions of the instrument or compass 5 are shown in exploded view in Fig. 3 and comprise the cup 32 upon which is affixed a dial 34 bearing the indicia of the usual compass dial. Preferably, the dial 34 is a highly reflective member formed of a light weight material. Disposed above and in spaced relation with the dial 34 is a plate 35 of a transparent material, such as glass, which bears a marker 36. As may be seen in Figs. 1 and 2, the plate 35 is supported in spaced relation with respect to the rotatable dial 34 by means of a yoke member 37 and clamps 38 which are screwed to the yoke member 37. The yoke member 37 preferably is formed integral with the frame member 19 and is provided with a cylindrical hole into which the cup 32, bearing the dial 5, projects. The Selsyn motor 31 is supported from the frame 19 by means of a split ring 39 and a threaded ring clamp 40 which engages cooperating threads in the frame member.

Supported directly above the dial plate 5 within a tubular portion 41 of the housing 28 is a housing 42 for the projection lens 6. The optical properties of the latter are such as to provide an enlarged image of the reflecting surface of dial 34 on any suitable screen (not shown). The mirror 4 is provided with an aperture 43 which permits passage of the converging beam of light after reflection from the surface of dial 34 to lens 6. The aperture furthermore is of such a size and is so positioned relative to the dial 34 and the beam of light that it blocks passage of the beam only to the central or unused portion of the dial.

In the operation of the projection system described, the marker 36 on the transparent plate 35 provides a true bearing of a ship's position. The reflective dial 34, which functions as a heading dial in the compass, is mounted on the shaft of the Selsyn motor 31 and rotates in accordance with the ship's position. In order that an enlarged image of the marker 36 and the indicia on the dial 34 may be provided, the light from the projection lamp 1 is condensed by means of lenses 2, 3 and changed in direction by mirror 4 to fall as a converging beam upon the members 34, 35. Since the member 34 has a highly reflecting upper surface, the converging beam of light is projected upwardly through the central aperture 43 in the mirror 4 to the projection lens 6 which focusses the image of the members 34, 35 upon any suitable screen, not shown. In the system, the lenses 2 and 3 provide a conical converging beam of light which is reflected from the mirror 4 and the reflecting surface of the dial 34 and focussed in the plane of the projector lens 6. As a result, by the time the light from the lamp 1 arrives at the aperture 43 after reflection from the surface of the dial 34, it is sufficiently condensed to pass entirely through this aperture and into the projecting lens 6. Furthermore, since the light from the source 1 arrives at the mirror 4 as a conical converging beam, the shadow caused by the aperture 43 is condensed when it falls upon the dial 34 so that it appears as a black spot on only the central or unused portion of this dial.

In the modification of my improved projection system illustrated schematically in Fig. 4, light from the source 1, after passing through the condensing lens 2, the filter 23 and the lens 3 and being formed into a converging beam, is projected through a transparent member 44 which is inclined at an angle to the path of the light beam. The member 44 may be, for example, a glass plate which is inclined at an angle to the converging beam of light. A portion 45 of the member 44 is provided with a reflecting surface on the side which faces the dial 5. The surface 45 may be formed in any suitable manner, as for example evaporating a metal on the surface of the member 44. The instrument 5 comprising the reflecting dial 34 and the bearing plate 35, is carried on the end of the rotor shaft 46 and the stator frame 47 of the horizontally disposed Selsyn motor 31. The reflecting surface 45 is so positioned with respect to the converging beam of light and is of such size with respect to the beam that it blocks or prevents passage of the rays of the beam of light to a portion of the reflecting surface of the dial 34 which is not used to convey any information. That is, since the indicia are located only around the edge of the dial 34 and no useful information is conveyed by obtaining a reflection from the central portion of this dial, the surface 45 may be allowed to block the light which otherwise would fall upon the central or unused portion of the dial 34.

The converging beam of light from the source 1, after reflection from the dial 34, is changed in direction by the surface 45 so that it passes to the projection lens 6. One of the advantages of this particular modification of the invention is that the source of light 1 is placed directly in front of the instrument 5 which is to be enlarged so that the Selsyn motor 31 may be placed in a horizontal position rather than in the vertical position of the apparatus of Fig. 1.

An important advantage of my projector system is that no physical connection between the instrument or indicating device which is being viewed and the projecting system is required. As a result, the system is particularly adapted for use in connection with Selsyn systems where even minute amounts of drag may adversely influence the operation of other elements connected with the Selsyn system. Another important advantage of the invention is that it permits the positioning of a light source at the side or in front of the instrument which is being viewed and does not require that light project through the instrument with which the projection system is being used. Another advantage of my projection system is that it is entirely a specular system and hence its light efficiency is very high permitting the use of small light sources and small optical elements.

While, in the foregoing, light from the source 1 has been described as being formed into a converging conical beam, it is apparent that the optical elements of the system may be rearranged, for example by forming the dial 34 as a concave mirror, so that a collimated beam of light may be employed. Furthermore, in some instances, it may be desirable, instead of using the mirror 4 or the reflecting surface 45 to change the direction of a beam of light, to use some other means such as a prism for so changing the direction of the beam of light.

While, in the foregoing, therefore I have shown particular embodiments of my invention, it will of course be understood that I do not wish to be limited thereto since various modifications may be made and I intend in the appended claims to cover any such modifications as fall within the true spirit and scope of my invention.

What I claim as new and desire to secure by Letters Patent of the United States, is:

1. In a projector, the combination comprising, a transparent plate having a marker thereon, a highly reflective surface rotatably supported in spaced relation with said plate, said surface having indicia thereon cooperating with said marker, means for illuminating said surface comprising a light source, a mirror mounted at an angle to both said light source and said surface for reflecting light from said source through said plate and upon said surface, said mirror having a central aperture, and an objective lens supported adjacent said aperture for collecting and projecting light rays reflected by said surface through said aperture to provide an enlarged image of said marker and indicia.

2. In a projector, the combination comprising, a transparent plate and a highly reflective plate mounted in spaced relation and for rotation one with respect to the other, one of said plates having indicia thereon and the other of said plates having a marker thereon cooperating with said indicia, means for illuminating said reflective plate comprising a light source, a mirror inclined at an angle to both said source and said plates and having a central aperture therein, and a condensing lens for converging light from said source upon said mirror to be reflected thereby through said transparent plate and upon said reflective plate, and an objective lens supported on the opposite side of said mirror from said plates for collecting and projecting light rays reflected by said reflective plate through said aperture to provide an enlarged image of said marker and indicia.

ARNOLD GOLDBERG.

REFERENCES CITED

The following references are of record in the file of this patent:

UNITED STATES PATENTS

| Number | Name | Date |
| --- | --- | --- |
| 1,996,920 | Hauser | Apr. 9, 1935 |
| 2,100,056 | Klamp et al. | Nov. 23, 1937 |
| 2,146,506 | Maisch | Feb. 7, 1939 |
| 2,210,090 | Lutz et al. | Aug. 6, 1940 |
| 2,217,388 | Smith | Oct. 8, 1940 |
| 2,243,235 | Weingraber et al. | May 27, 1941 |
| 2,373,929 | Turrenttini | Apr. 17, 1945 |